US011479145B2

(12) United States Patent
Gohla-Neudecker et al.

(10) Patent No.: US 11,479,145 B2
(45) Date of Patent: Oct. 25, 2022

(54) ELECTRIC STORAGE DEVICE FOR PROVIDING ELECTRIC ENERGY FOR A CHARGING OPERATION OF AT LEAST ONE ELECTRICALLY-DRIVEN MOTOR VEHICLE, AND RETROFIT MODULE AND OPERATING METHOD

(71) Applicant: Bayerische Motoren Werke Aktiengesellschaft, Munich (DE)

(72) Inventors: Bodo Gohla-Neudecker, Munich (DE); Jan Hesselmann, Neufahrn (DE); Soeren Mohr, Munich (DE); Albrecht Pfeiffer, Fahrenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 16/784,671

(22) Filed: Feb. 7, 2020

(65) Prior Publication Data

US 2020/0171967 A1 Jun. 4, 2020

Related U.S. Application Data

(63) Continuation of application No. PCT/EP2018/071641, filed on Aug. 9, 2018.

(30) Foreign Application Priority Data

Aug. 10, 2017 (DE) .................. 10 2017 213 938.2

(51) Int. Cl.
*H02J 7/00* (2006.01)
*H02J 7/14* (2006.01)
(Continued)

(52) U.S. Cl.
CPC .............. *B60L 58/26* (2019.02); *B60L 53/11* (2019.02); *B60L 53/16* (2019.02); *B60L 53/18* (2019.02);
(Continued)

(58) Field of Classification Search
CPC ........ B60L 58/26; B60L 53/302; B60L 53/53; B60L 53/11; B60L 53/16; B60L 53/18
(Continued)

(56) References Cited

U.S. PATENT DOCUMENTS

| 5,909,099 A * | 6/1999 | Watanabe ............... B60L 53/34 |
| | | 320/108 |
| 6,396,241 B1 * | 5/2002 | Ramos .................... B60L 53/12 |
| | | 320/108 |

(Continued)

FOREIGN PATENT DOCUMENTS

CN 106828157 A 6/2017
DE 10 2010 024 278 A1 12/2011
(Continued)

OTHER PUBLICATIONS

PCT/EP2018/071641, International Search Report dated Jan. 22, 2019 (Three (3) pages).
(Continued)

*Primary Examiner* — Alexis B Pacheco
(74) *Attorney, Agent, or Firm* — Crowell & Moring LLP

(57) ABSTRACT

An electric storage device for providing electric energy for a charging operation of at least one electrically-driven motor vehicle has a storage unit for storing the energy, a cooling assembly for providing cooling capacity and a coolant circuit which is designed to convey thermal energy from the storage unit to the cooling assembly by a coolant. At least one charging cable is coupled to the storage unit, each charging cable being designed for connection to the motor vehicle and having a cooling channel. A distribution system is provided which is designed to divert some of the coolant into the cooling channel of the charging cable or to carry away thermal energy from the cooling channel into the coolant via a heat exchanger.

11 Claims, 1 Drawing Sheet

(51) Int. Cl.
*B60L 58/26* (2019.01)
*B60L 53/302* (2019.01)
*B60L 53/10* (2019.01)
*B60L 53/16* (2019.01)
*B60L 53/18* (2019.01)
*B60L 53/53* (2019.01)

(52) U.S. Cl.
CPC ............ *B60L 53/302* (2019.02); *B60L 53/53* (2019.02); *B60L 2240/545* (2013.01)

(58) Field of Classification Search
USPC .................................................. 320/109, 137
See application file for complete search history.

(56) References Cited

U.S. PATENT DOCUMENTS

| | | | |
|---|---|---|---|
| 2010/0045233 A1* | 2/2010 | Alameh | F03D 80/60 |
| | | | 320/114 |
| 2012/0041855 A1* | 2/2012 | Sterling | B60L 53/65 |
| | | | 705/34 |
| 2012/0043935 A1* | 2/2012 | Dyer | B60L 53/305 |
| | | | 320/109 |
| 2015/0217654 A1* | 8/2015 | Woo | B60L 53/302 |
| | | | 320/109 |
| 2018/0170201 A1* | 6/2018 | Miller | B60L 53/60 |

FOREIGN PATENT DOCUMENTS

| | | |
|---|---|---|
| DE | 10 2012 220 218 A1 | 5/2014 |
| DE | 10 2015 112 347 A1 | 2/2017 |
| EP | 0 823 766 A1 | 2/1998 |

OTHER PUBLICATIONS

German Search Report issued in German application No. 10 201 213 938.2 dated Oct. 25, 2021, with Statement of Relevancy (Eight (8) pages).

* cited by examiner

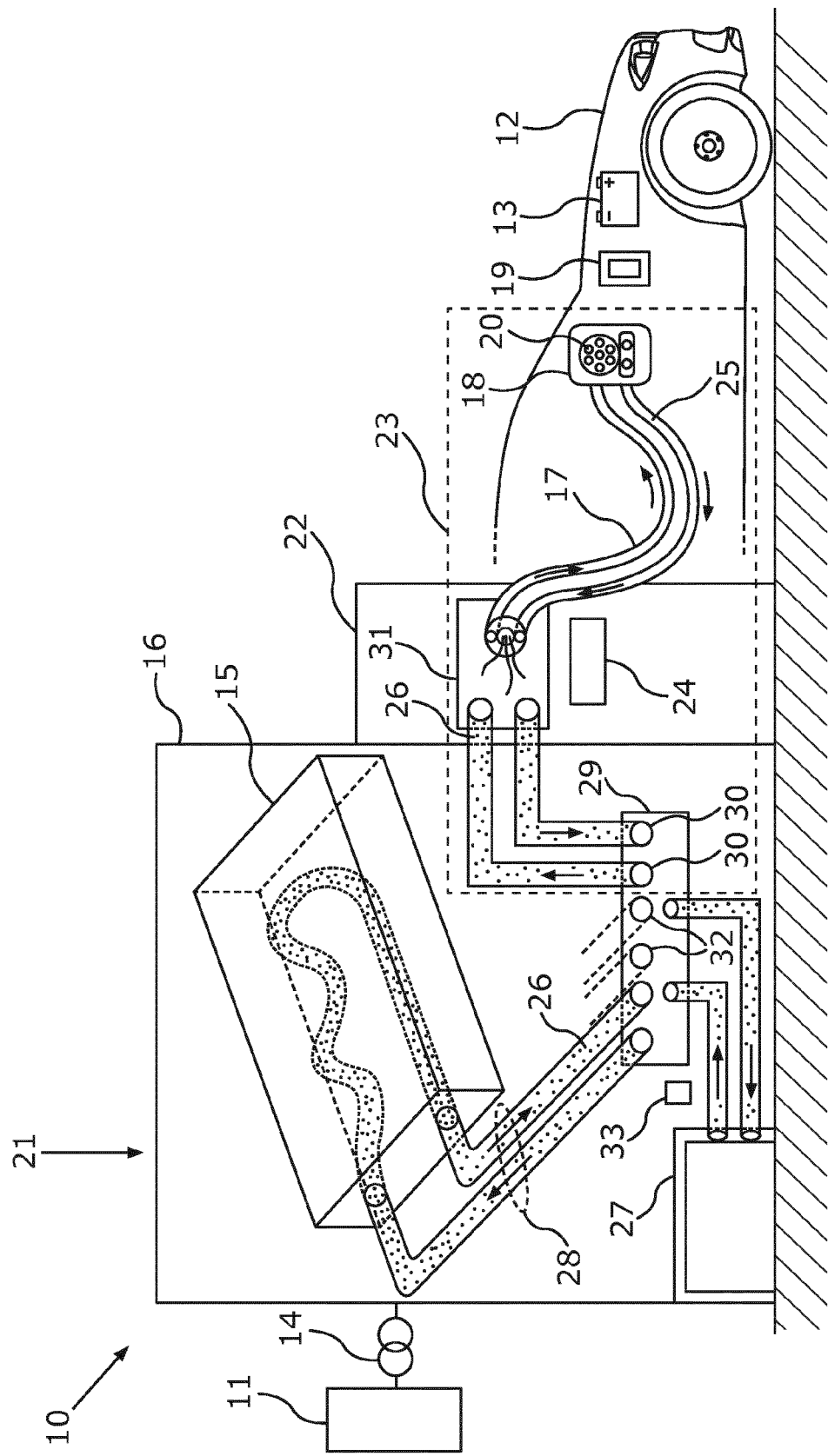

ELECTRIC STORAGE DEVICE FOR PROVIDING ELECTRIC ENERGY FOR A CHARGING OPERATION OF AT LEAST ONE ELECTRICALLY-DRIVEN MOTOR VEHICLE, AND RETROFIT MODULE AND OPERATING METHOD

CROSS REFERENCE TO RELATED APPLICATIONS

This application is a continuation of PCT International Application No. PCT/EP2018/071641, filed Aug. 9, 2018, which claims priority under 35 U.S.C. § 119 from German Patent Application No. 10 2017 213 938.2, filed Aug. 10, 2017, the entire disclosures of which are herein expressly incorporated by reference.

BACKGROUND AND SUMMARY OF THE INVENTION

The invention relates to an electrical storage apparatus for storing electrical energy, by means of which an electrically driveable motor vehicle can then be charged. The invention also includes a retrofit module in order to retrofit or to be able to retrofit a conventional electrical stationary store. The invention finally also comprises a method for operating the storage apparatus according to the invention.

Electrically driveable motor vehicles must be able to be supplied with electrical energy that is intended to be able to be transmitted to the motor vehicle to be charged at a relatively high power, for example at more than 5 kW but, in particular, more than 20 kW or even more than 50 kW. In order not to have to transmit the energy at this power over a relatively long stretch of the public electricity grid, the electrical energy can be buffer-stored at the location where the charging process is intended to take place, or at least near to this charging location, for example closer than 1 km. For this purpose, what is known as an electrical stationary store can be provided, in which the energy is stored in a storage unit. Such a storage unit may be formed, for example, from a plurality of individual electrical stores, for example batteries. In order to control the temperature of the storage unit in order that the temperature thereof is situated in a predetermined temperature window, a stationary store may have a cooling assembly for providing cooling power. A cooling circuit can then to this end dissipate thermal energy from the storage unit and convey it to the cooling assembly, where the thermal energy is then drawn from the cooling medium of the cooling circuit in a known manner. This drawing of the thermal energy constitutes the provision of the cooling power. The cooling circuit may also be of branched design.

In order to transmit the electrical energy to the motor vehicle, a charging cable can be provided, which can be connected to the motor vehicle. Such a charging connection device having a charging cable may be designed, for example, as what is known as a charging column, similarly to a gas pump for gasoline. For a charging process, the electrical energy is then transmitted from the local stationary store to the charging column, where it then reaches the motor vehicle via the charging cable. If the described electrical powers are set here, that is to say the electrical energy is transmitted through the charging cable at a correspondingly high electric current, the charging cable may heat up on account of the line and contact losses.

For this reason, it is envisaged to also provide a cooling assembly for active cooling in a charging column in order to be able to transmit the electrical energy in a charging cable that is as thin and/or light as possible. The cooling makes possible continued use at high currents. This makes it possible for the first time for anyone to handle DC rapid-charging cables with very high powers.

In order to thus be able to provide a charging power of more than 5 kW but, in particular, more than 20 kW or even more than 50 kW, for a charging process, additional technical outlay is necessary for the active cooling of the storage unit of the stationary store and the charging cable of the charging column. This makes the upgrading or increasing of the charging powers technically complex and costly.

The invention is based on the object of transmitting electrical power from a storage unit through a charging cable to an electrically driveable motor vehicle.

The invention provides an electrical storage apparatus for providing electrical energy in order to charge at least one electrically driveable motor vehicle. The storage apparatus can be formed on the basis of an electrical stationary store, as has been described at the beginning. In general, the storage apparatus thus has the described storage unit for storing the energy and a cold assembly or cooling assembly for providing cooling power. A cooling circuit is configured to convey thermal energy from the storage unit to the cooling assembly by means of a cooling medium.

In order to now transmit the electrical energy from the storage unit to the motor vehicle, the electrical storage apparatus has at least one charging cable, which is coupled to the storage unit. A single charging cable or a plurality of charging cables can thus be provided. In this case, each charging cable can be designed in a manner known per se for connection to a motor vehicle. For example, the charging cable may have a plug for plugging into a charging socket of the respective motor vehicle.

Each charging cable now furthermore has a cooling channel. In other words, the charging cable itself can have the cooling medium flowing through it. Nevertheless, an additional cooling assembly is not necessary. Instead, in the storage apparatus, a distributor device is provided, which is configured to divert a portion of the cooling medium of the cooling circuit into the cooling channel of the charging cable or to dissipate the thermal energy from the cooling channel into the cooling medium by means of a heat exchanger. In other words, that is to say the at least one charging cable can be cooled using the cooling power of the cooling assembly, which is also used to cool the storage unit. Cooling power is thus branched off to the respective charging cable by means of the distributor device. It is thus not necessary to provide two cooling assemblies, namely one for the storage unit and one for the at least one charging cable.

The invention produces the advantage that a redundant embodiment of the cooling technology is not necessary since the at least one charging cable and the storage unit both use the same cooling assembly. Additionally, a greater degree of efficiency is produced by using a single cooling assembly for the storage unit and the charging cable in comparison to providing two cooling assemblies. The reason for this is that two cooling assemblies would have to be operated at a lower partial load more often than a single cooling assembly, as a result of which higher running costs would be produced in the case of two cooling assemblies and possibly also longer standstill times and/or idle times in which cooling of the charging cable and/or of the storage unit is not necessary. In addition, maintenance costs and the outlay for certification are also reduced when only one single cooling assembly has to be provided.

The invention also includes developments whose features produce additional advantages.

The stationary store can be connected to a public electricity grid in order to receive the energy from the electricity grid. In this case, the charging power drawn for recharging the storage unit of the stationary store may be lower than the charging power then provided with which the energy from the storage unit is transmitted to the motor vehicle.

The storage apparatus according to the invention can have one charging cable or a plurality of charging cables, wherein a motor vehicle can be connected to each charging cable for a charging process. A plug for plugging into a charging socket of the respective motor vehicle can be provided on the respective charging cable. One development makes provision for the respective cooling channel of the respective charging cable to be coupled to the plug of the charging cable by means of a heat exchanging device and/or for the cooling channel to even be led or laid through the plug. As a result, heat losses, which can result due to contact losses in the plug itself, can also be dissipated. The heat exchanging device for dissipating the heat losses from the plug into the cooling medium can be realized, for example, based on a thermal coupling, which may be realized by means of a metal or a metal alloy. The cooling channel can be led, for example, based on a hollow space in a plug housing of the plug and/or by means of a hose through the plug itself.

The cooling medium may comprise a gas (for example air) and/or a liquid (for example a water/glycol mixture and/or an oil and/or a coolant). Examples of coolant are: R134a, R1234yf, R744. The possible cooling media described may in this case be provided each individually in a plurality of segments separated from one another. Such segments can be coupled by means of heat exchangers. Provision may also be made for a single cooling medium of the described type to be provided in the entire cooling circuit.

The storage apparatus according to the invention may be of multi-part design. To this end, one development makes provision for the at least one charging cable to be provided by a respective charging connection device, for example a charging column, which is provided structurally separate from a housing of the storage unit. In order to then transmit the energy from the storage unit to the charging column, provision may be made for an electrical coupling of the storage unit to the charging connection device to be provided by means of a DC/AC converter (DC—direct current, AC—alternating current) provided on the storage unit and an AC/DC converter provided in the charging connection device. In other words, the transmission of the energy is effected by means of alternating current. This produces the advantage that the housing of the storage unit on the one hand and the charging connection device on the other hand can be coupled, for example, by means of a public electricity grid. As a result, the additional laying of electrical cables between the storage unit and the charging connection device is then unnecessary. Only the laying of a hose system and/or pipe system for transmitting the cooling medium between the cooling assembly and the charging connection device is then necessary.

As an alternative thereto, provision may be made for the charging cable on the one hand and the storage unit on the other hand to be integrated to form a structural unit of the storage apparatus. The charging cable can then be coupled to the storage unit by means of a DC busbar system or a DC cable system and by means of a DC/DC converter and the storage apparatus can be configured to transmit the energy from the storage unit to the charging cable by means of direct current. Provision is made, in particular, for the energy to be transmitted exclusively by means of direct current. No DC/AC conversion and no AC/DC conversion is thus necessary for the transmission of the energy from the storage unit to the charging cable but only voltage adjustment by means of the DC/DC converter. Due to the omitted converter steps, corresponding converter losses are also reduced. The efficiency of the operation of the storage apparatus and the charging infrastructure therefore increases.

In accordance with one development, the distributor device, by means of which the cooling medium is branched off from the cooling circuit and provided in the charging cable or by means of which thermal energy is dissipated from the cooling channel of the charging cable, has at least one respective additional connection, by means of which a respective further component of the storage apparatus is connected to the cooling circuit. In other words, the distributor device is used to lead the cooling medium or the cooling power also to at least one further component of the storage apparatus in order to be able to dissipate thermal energy from there too. Such a component may be, for example, a transformer and/or the AC/DC converter and/or the DC/AC converter and/or the DC/DC converter and/or a busbar or a cable, as can be provided, for example, to provide a DC bus. This produces the advantage that the cooling assembly can also be used to cool at least one further component.

In the distributor device, a connection for connecting the charging cable and/or an additional connection may each be designed, for example, as a connector or as a valve for plugging or connecting a cooling hose or cooling pipe. The distributor device itself may be designed, for example, as a pipe or as a canister. The distributor device can also have in the manner a heat exchanger, which absorbs thermal energy from the charging cable and transmits it to the cooling medium. The cooling circuit can flush the distributor device with the cooling medium. At the connection the cooling medium can then flow into a charging cable and/or at an additional connection can flow into one of the other components.

One development makes provision for a common control unit to be provided to control the cooling assembly and to control a power output of the storage unit to the charging cable and preferably also for billing the output energy and/or a period of use. In other words, two control units, one for the operation of the storage unit and one for the operation of a charging connection device (for example charging column), are not necessary. A single central control unit for billing running costs can thus be provided, in particular, for a plurality of charging cables. The control unit can be formed on the basis of a microprocessor or another controller (for example a programmable logic controller—PLC).

As already stated, the storage apparatus may be a design variant of a stationary store. One development accordingly makes provision in this regard for the storage unit and the cooling assembly to be designed as a stationary store, as is known from the prior art, and for the charging cable and an electrical connecting device to be provided to electrically connect the charging cable to the stationary store as a retrofit module for the stationary store. A conventional stationary store can thus be expanded by means of the retrofit module to the extent that at least one charging cable can be retrofitted in the stationary store.

The charging process may be a charging process or a discharging process. In other words, provision is made for the charging process to provide a flow of energy from the storage apparatus to the motor vehicle and/or from the motor vehicle to the storage apparatus. Here, in each charging process, a different flow direction of the flow of energy can be provided or set.

The invention also accordingly comprises such a retrofit module for an electrical stationary store, which retrofit module provides at least one charging cable and an electrical connecting device for electrically connecting the at least one charging cable to the stationary store. In addition, a DC/DC converter (as power controller) and/or a control unit (for controlling a charging process) and/or a billing unit (for billing transmitted energy and/or a period of use) can be provided in the retrofit module. The retrofit module can be designed, for example, as a development of the retrofit module, which has been applied for at the German patent and trademark office under the file reference DE 10 2017 204 074.2. The at least one charging cable also has in each case the described cooling channel. In addition, each charging cable has a connection device, which is configured to couple or to connect the cooling channel of the charging cable to a distributor device of a cooling circuit of the stationary store. The distributor device may be a constituent part of the retrofit module or even be a constituent part of the stationary store. The cooling power of the cooling assembly of the stationary store can therefore also be used to cool the at least one charging cable of the retrofit module.

The invention also includes developments of the retrofit module, which have features as have already been described in connection with the developments of the storage apparatus according to the invention. The retrofit module can thus also have at least one charging cable with an actively cooled plug. In addition, provision may be made for an AC/DC converter and/or a transformer of the retrofit module to also be designed to be cooled by means of the cooling circuit of the stationary store.

Operating the storage apparatus according to the invention also produces a method that is likewise a constituent part of the invention. In the method, a storage unit of a storage apparatus stores electrical energy for a charging process, in which at least one electrically driveable motor vehicle is charged. A cooling assembly provides cooling power and a cooling circuit conveys thermal energy from the storage unit to the cooling assembly by means of a cooling medium. The cooling medium is thus cooled there and therefore the thermal energy is removed or dissipated from the cooling medium.

In the storage apparatus, at least one charging cable is coupled to the storage unit (that is to say in the described manner either by means of AC/alternating current and DC/direct current or exclusively by means of DC/direct current). The respective charging cable is designed for connection to the motor vehicle and has a cooling channel, wherein a distributor device diverts a portion of the cooling medium into the cooling channel of the charging cable or absorbs heat from the cooling channel and transmits it to the cooling medium by means of a heat exchanger. Thus, the charging cable is therefore also cooled.

The invention also includes developments of the method according to the invention, which have features as have already been described in connection with the developments of the storage apparatus according to the invention.

Further features of the invention result from the claims, the FIGURE and the description of the FIGURE. The features and combinations of features mentioned above in the description and those mentioned below in the description of the FIGURE and/or features and combinations of features shown purely in the FIGURE are able to be used not only in the respectively specified combination but also in other combinations or alone.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a schematic illustration of a storage apparatus according to the invention.

DETAILED DESCRIPTION OF THE DRAWING

The invention is now explained in more detail based on a preferred exemplary embodiment and with reference to the drawing.

The FIGURE shows an electrical storage apparatus 10, by means of which electrical energy from an electricity grid 11 can be buffer-stored in order to then supply power to an electrically driveable motor vehicle 12 by means of the stored energy. In the example, a traction battery 13 of the motor vehicle 12 can therefore be recharged. A charging power during transmission of the energy to the motor vehicle 12 may be greater than 5 kW, in particular greater than 10 kW.

The storage apparatus 10 can be connected to the electricity grid 11, for example, by means of a transformer 14. The storage apparatus 10 can have a storage unit 15, in which the energy can be buffer-stored. The storage unit 15 can be formed, for example, based on electrochemical storage cells or battery cells. For example, a plurality of battery cell modules or else a plurality of batteries can be arranged in the storage apparatus 10. The storage unit 15 can be arranged, for example, in a housing 16 of the storage apparatus 10. An overall storage capacity of the storage unit 15 can lie in a range of from 20 kWh to 100 MWh. The storage unit 15 can have a plurality of individual stores, whose storage capacity can lie in a range of from 0.1 kWh to 10 MWh.

In order to supply energy to the motor vehicle 12, a charging cable 17 can be provided, which can have a plug 18, which can be plugged into a charging socket 19 of the motor vehicle in order to connect electrical lines 20 of the charging cable 17 to the motor vehicle 12.

In the example illustrated, the storage apparatus 10 can be formed based on a stationary store 21, which can have the storage unit 15. The stationary store 21 can be connected to the electricity grid 11 in order to buffer-store electrical energy locally in order that the energy there can be provided at a greater power than would be possible or permissible directly from a power plant by means of the electricity grid 11.

The charging cable 17 can be a constituent part of a charging connection device 22, which can be designed, for example, as a charging column. The charging cable 17 can in this case be a constituent part of a retrofit module 23, by way of which the stationary store 21 may have been expanded by the functionality of the charging option. The retrofit module 23 can for this purpose have the charging cable 17 and a connection device 24, by means of which the electrical lines 20 of the charging cable 17 can be electrically connected, for example, by means of a DC/DC converter to a DC bus (busbars or cables for direct current) or to a DC/DC converter in order to transmit a direct current from the storage unit 15 to the charging cable 17 without AC conversion.

In the storage apparatus 10, it is ensured that, during transmission of the energy from the storage unit 15 to the motor vehicle 12, despite the heat losses arising in the charging cable 17 in the case of a prescribed rated power, that the charging cable is not heated above a predetermined maximum value. To this end, the charging cable 17 can have a cooling channel 25, through which a cooling medium 26 can be pumped by a cooling assembly 27. The cooling assembly 27 can be constructed in a manner known per se and have, for example, a compressor and/or heat exchanger.

In this case, the cooling assembly 27 does not have to be a constituent part of the retrofit module 23 or the charging connection device 22. Instead, provision can be made in the storage apparatus 10 for the same cooling assembly 27 to be used as is also provided to cool the storage unit 15. To cool the storage unit 15, a cooling circuit 28 can be provided, through which the cooling assembly 27 pumps the cooling medium 26. A distributor device 29 can be provided, which has a connection 30 for connecting the cooling channel 25 of the charging cable 17. An outlet and an inlet for flushing can be provided at the connection 30. As a result, a portion of the stream of cooling medium 26 can be branched off from the cooling circuit 28 and led through the cooling channel 25. As an alternative thereto, the connection 30 can have a heat exchanger, which transmits thermal energy from the cooling channel 25 to the cooling medium 26 so that a cooling medium of the cooling channel 25 can remain separate from the cooling medium 26.

The distributor device 29 can be designed, for example, as a chamber or a pipe. The connection 30 can in each case have, for example, a connector or a valve as inlet and outlet. The connection device 31 can be designed, for example, as an adapter in order to connect the cooling channel 25 of the charging cable 17 to the connection 30. The connection device 31 can also have the heat exchanger.

The distributor apparatus 29 can have at least one additional connection 32 in order to supply at least one further component of the storage apparatus 10 with the cooling medium 26. For example, an AC/DC converter or the DC/DC converter or a DC/DC converter by means of which at least one component of the storage unit 15 is coupled to the DC bus, and/or the transformer 14 can be cooled and/or the interior air of the storage apparatus 10 and/or the charging connection device 22 can be cooled.

An additional use of the present cooling assembly 27 therefore takes place in the case of a stationary store 21 by virtue of at least the charging cable 17 also being cooled in the charging connection device 22 by way of the use thereof. In this case, a spatial proximity (1 m to 1 km) of the charging connection device 22 to the stationary store 21 can be utilized, wherein, for transmitting the electrical energy, the electric current can then furthermore be transmitted, for example, by means of the electricity grid 11 as alternating current (AC) (not illustrated). As an alternative thereto, a single technical unit can be formed, as is illustrated in the FIGURE. The stationary store 21 can then be coupled to the charging connection device 22 directly (without another AC conversion) by means of the DC bus and the DC/DC converter purely on the DC side. Conversion to an alternating current during the transmission of the energy from the storage unit 15 to the charging cable 17 is then not necessary. A required power controller (DC/DC converter) can be provided in the retrofit module 23.

To produce or provide the technical unit, the charging cable 17 can be provided by means of the described retrofit module 23. In addition, not only the cooling assembly 27 itself but also a control unit 33 that controls the cooling assembly 27 can likewise be used synergistically. Control processes in the charging connection device 22, for example billing the transmitted energy, can therefore be carried out by the control unit 33, with the result that an additional controller in the charging connection device 22 is not necessary. As an alternative thereto, however, a separate control unit and/or billing unit can also be provided in the retrofit module 23.

In the stationary store 21, only one additional connection 30 in the distributor device 29 is necessary.

Overall, the stationary store 21 can therefore additionally take on the cooling function for the charging cable 17 and/or the plug 18 in the case of a DC charging process of the motor vehicle 12. However, its own cooling assembly 27 is thus also better used. A separate cooling assembly for the charging cable 17 is saved. Accordingly, a lower amount of coolant or heat exchanger, that is to say less cooling medium 26, is also necessary. The total cooling power that would have to be provided for two cooling assemblies is lower on account of a shorter pause time and/or short load time that results in the case of just one cooling assembly 27. A greater efficiency during operation of the single cooling assembly 27 of the stationary store 21 is therefore obtained since operation takes place more often in full load and therefore the degree of efficiency over the load is increased.

In addition, the lower number of components results in a structural simplification of the storage apparatus 10 overall, as a result of which a reduction in complexity and therefore also a lower number of technical components for the provision are necessary. A central control unit 33 can also be made possible for the billing of running costs, the approval of the energy transmission to the motor vehicle 12 and certification.

The storage apparatus 10 can therefore be operated with lower investment costs and also with lower running costs.

The cooling medium 26 used can be different depending on the application of the storage apparatus 10. The cooling medium can be, for example, air or a water/glycol mixture or oil or a coolant.

The storage apparatus 10 can be provided for supplying electrical energy to electric boats, ships, buses, commercial vehicles, transport vehicles, passenger motor vehicles, bicycles, construction machines such as, for example, excavators, aircraft and/or drones.

The control unit 33 can be designed, for example, as a control instrument.

The cooling channel 25 can be formed, for example, based on hoses, which can be laid parallel to the electrical copper wires of the charging cable 17. The cooling channel 25 can also be designed as a hose or sheath, in which electrical conduction elements of the charging cable 17 can be arranged or laid.

The example shows how, in a stationary store, synergistic provision of cooling power both for components of the stationary store itself and also for a charging column can be effected.

LIST OF REFERENCE CHARACTERS

10 Storage apparatus
11 Electricity grid
12 Motor vehicle
13 Traction battery

14 Transformer
15 Storage unit
16 Housing
17 Charging cable
18 Plug
19 Charging socket
20 Electrical lines
21 Stationary store
22 Charging connection device
23 Retrofit module
24 Electrical connection device
25 Cooling channel
26 Cooling medium
27 Cooling assembly
28 Cooling circuit
29 Distributor device/heat exchanger
30 Connection
31 Connection device
32 Additional connection
33 Control unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical storage apparatus for providing electrical energy for a charging process of an electrically driveable motor vehicle, comprising:
    a storage unit for storing the electrical energy,
    a cooling assembly for providing cooling power;
    a cooling circuit disposed within the storage unit which is configured to convey thermal energy from the storage unit to the cooling assembly by a cooling medium;
    a charging cable coupled to the storage unit, wherein the charging cable is configured for connection to the electrically driveable motor vehicle and has a cooling channel; and
    a distributor device disposed within a housing of the electrical storage apparatus which is configured to divert a portion of the cooling medium from the cooling circuit into the cooling channel of the charging cable or to dissipate thermal energy from the cooling channel into the cooling medium of the cooling circuit via a heat exchanger.

2. The electrical storage apparatus according to claim 1, wherein the charging cable has a plug for plugging into a charging socket of the electrically driveable motor vehicle and wherein the cooling channel is coupled to the plug by a heat exchanging device or the cooling channel is led through the plug.

3. The electrical storage apparatus according to claim 1, wherein a gas and/or a liquid is the cooling medium.

4. The electrical storage apparatus according to claim 1, wherein the charging cable is part of a charging connection device which is structurally separate from a housing of the storage unit and wherein an electrical coupling of the storage unit to the charging cable is provided by a DC/AC converter disposed on the storage unit and an AC/DC converter disposed in the charging connection device.

5. The electrical storage apparatus according to claim 1, wherein the charging cable is coupled to the storage unit by a DC bus and a DC/DC converter and wherein the electrical storage apparatus is configured to transmit the electrical energy from the storage unit to the charging cable by direct current.

6. The electrical storage apparatus according to claim 1, wherein the distributor device has a connection via which an additional component of the electrical storage apparatus is connected to the cooling assembly.

7. The electrical storage apparatus according to claim 1 further comprising a common control unit, wherein the common control unit controls the cooling assembly and a power output of the storage unit to the charging cable.

8. The electrical storage apparatus according to claim 1, wherein the storage unit and the cooling assembly are configured as an electrical stationary store, wherein the charging cable and an electrical connecting device comprise a retrofit module, and wherein the electrical connecting device electrically connects the charging cable of the retrofit module to the electrical stationary store.

9. The electrical storage apparatus according to claim 1, wherein the charging process provides a flow of electrical energy from the electrical storage apparatus to the electrically driveable motor vehicle and/or from the electrically driveable motor vehicle to the electrical storage apparatus.

10. A retrofit module for an electrical stationary store, comprising:
    a charging cable and an electrical connecting device to electrically connect the charging cable to the electrical stationary store; and
    a connection device for a cooling channel of the charging cable, wherein the connection device is configured to couple the cooling channel of the charging cable to a distributor device of a cooling circuit that is disposed within a storage unit for storing electrical energy of the electrical stationary store, wherein the distributor device is disposed within a housing of the electrical stationary store.

11. A method for operating the electrical storage apparatus according to claim 1, comprising the acts of:
    diverting a portion of the cooling medium into the cooling channel of the charging cable by the distributor device; or
    dissipating thermal energy from the cooling channel into the cooling medium by the distributor device via a heat exchanger.

* * * * *